United States Patent
Chiang (10) Patent No.: US 7,446,622 B2
(45) Date of Patent: Nov. 4, 2008

(54) TRANSMISSION LINE WITH LOW DISPERSIVE PROPERTIES AND ITS APPLICATION IN EQUALIZATION

(75) Inventor: Ting-Kuang Chiang, Saratoga, CA (US)

(73) Assignee: Infinera Corporation, Sunnyvale, CA (US)

(*) Notice: Subject to any disclaimer, the term of this patent is extended or adjusted under 35 U.S.C. 154(b) by 29 days.

(21) Appl. No.: 10/927,565

(22) Filed: Aug. 26, 2004

(65) Prior Publication Data
US 2005/0052255 A1    Mar. 10, 2005

Related U.S. Application Data

(60) Provisional application No. 60/500,523, filed on Sep. 5, 2003.

(51) Int. Cl.
  *H04B 3/04*    (2006.01)
(52) U.S. Cl. .................... 333/18; 333/28 R
(58) Field of Classification Search .......... 333/28 R; 330/124 R, 304; 375/229, 230
See application file for complete search history.

(56) References Cited

U.S. PATENT DOCUMENTS

| | | | |
|---|---|---|---|
| 1,713,603 A | 5/1929 | Hoyt | |
| 1,815,254 A | 7/1931 | Hoyt | |
| 2,158,978 A | 5/1939 | Bowman-Manifold et al. | |
| 2,164,492 A | 7/1939 | Blumlein et al. | |
| 3,786,374 A | 1/1974 | Berfried | |
| 4,638,191 A | 1/1987 | Baumgartner et al. | |
| 5,069,070 A | 12/1991 | Schmitz | |
| 5,172,072 A * | 12/1992 | Willems et al. | 330/149 |
| 5,483,681 A * | 1/1996 | Bergsten et al. | 455/126 |
| 5,502,392 A | 3/1996 | Arjavalingam et al. | |
| 5,834,995 A | 11/1998 | Richards et al. | |
| 6,678,319 B1 * | 1/2004 | Jamali | 375/234 |
| 6,738,919 B2 * | 5/2004 | Williams et al. | 713/401 |
| 6,965,617 B2 * | 11/2005 | Hasegawa et al. | 370/503 |
| 2001/0043647 A1 | 11/2001 | Belge | |
| 2002/0190775 A1 | 12/2002 | Magoshi | |

OTHER PUBLICATIONS

John Poulton, "Signaling in High-Performance Memory Systems", Slide Presentation of 59 slides, ISSCC 1999.
Thomas H. Lee, "The Design of CMOS Radio-Frequency Integrated Circuits", pp. 119-123 and p. 124, Cambridge University Press, 1999.

(Continued)

*Primary Examiner*—Stephen E Jones
(74) *Attorney, Agent, or Firm*—W. Douglas Carothers, Jr.

(57) ABSTRACT

A transmission line is provided with added shunt resistance, $R_{SH}$, distributed along the length of the micro transmission line permitting the extension of constant characteristic impedance to the transmission line to lower signal frequencies. The loss in gain to the signal propagating the transmission line due to the added resistance can be compensated for by amplification provided at the output of the transmission line or at output taps provided along the length of the transmission line such as in cases where the line is utilized as a circuit delay line. An exemplified application disclosed is an analog delay line formed as a metal microstrip in an IC chip circuit provided, for example, in a feed forward equalizer (FFE).

18 Claims, 4 Drawing Sheets

OTHER PUBLICATIONS

Christer Svensson, "Electrical Interconnects Revitalized", Linköping University, Slide Presentation of 62 Slides, Chalmers 2003.

"High Speed Logic—Chapter 4—Transmission Lines", 1998 (Origin Unknown).

Dima Smolyansky et al., "High-Speed Digital Interconnect Modeling from TDR measurements", TDA Systems, Inc., DesignCom 2000.

* cited by examiner

TRANSMISSION LINE WITH LOW DISPERSIVE PROPERTIES AND ITS APPLICATION IN EQUALIZATION

REFERENCE TO A RELATED APPLICATION

This application claims priority of U.S. provisional application Ser. No. 60/500,523, filed Sep. 5, 2003, which application is incorporated herein by reference in its entirety.

BACKGROUND OF THE INVENTION

1. Field of the Invention

This invention relates generally to impedance balanced transmission lines and more particularly to micro or microstrip transmission lines, such as, for example, fabricated in integrated circuits (ICs) or formed on PCBs.

2. Description of the Related Art

The application of high frequency transmission lines in integrated circuits (ICs) or in LSI circuits is known. The characteristic impedance of such transmission lines follows the well known module equation per equation (1) below:

$$Z_o = \sqrt{(R+j\omega L)/(G+j\omega C)} \quad (1)$$

R is series resistance per unit length (Ω/mm or cm), G is the shunt (parallel conductance) Sieman per unit length (S/mm or in cm), L is the line or parallel inductance per unit length (H/mm or cm) and C is the line capacitance per unit length (F/mm or cm) and ω is the operating frequency (2π times the frequency).

The propagation constant is $$\gamma = \sqrt{(R+j\omega L)(G+j\omega C)} = \alpha + j\beta, \quad (2)$$

where b is a complex number. The real part, $\alpha$, is called the attenuation constant and the imaginary part, $\beta$, is called the phase constant. The group velocity, $V_g$ is:

$$V_g = \frac{d\omega}{d\beta} \quad (3)$$

Impedance of a nearly lossless, ideal transmission line is frequency independent when R and G are zero or nearly zero, i.e., $R \ll j\omega L$ and $G \ll j\omega C$:

$$Z_o = \sqrt{L/C} \quad (4)$$

In this case, $\alpha$ is equal to zero and $\beta = \omega\sqrt{LC}$, and, therefore, group velocity, $V_g$, in equation (3) is constant over frequency and the characteristic impedance, $Z_0$, is constant and the transmission line will not be dispersive, that is, there will not be any pulse spreading due to group velocity delay (GVD), since, in reality, the propagation of a signal in the transmission line has a linewidth made up of multiple different frequencies. The dielectric losses are small and the value G in the above equation (1) is typically ignored. Thus, the function in this case is similar to that of just pure passive transmission line resistance resulting in no or little signal dispersion. Therefore, if some control is exercised over transmission line constraints, a uniform group delay for a propagating high frequency signal can be achieved even with a lossy line, at least in principal, except that there will be some skin effect at very high frequencies rendering the line lossy. By choosing RC=GL or, equivalently, choosing the L/R time constant of the series impedance Z equal to the C/G time constant of the shunt resistance Y, the result is that a constant group velocity delay (GVD) in the transmitted signal in the transmission line is achieved at least for frequencies where R and G have little value so that equation (2) holds substantially true. This has also been referred to as the Heaviside relationship, an early investigator of transmission lines in telephony.

In the case of microstrip transmission lines, when the signal frequency is very low, such as in the multiple megahertz or kilohertz frequency range or lower, the series resistance, R, becomes large since ω is going to zero. In such a case, R becomes an important consideration in transmission line design. On the other hand, when the signal frequency is very high, such as in the cases of multiple GHz range, serious skin effect can result in the transmission line resulting high line losses. It has been suggested by those skilled in the art that setting LG=RC is best accomplished by increasing either L or C, rather than by increasing R or G because increasing the series resistance and/or shunt resistance provides an undesirable effect of increased transmission line attenuation. See, as an example, page 124 in the book entitled, "*The Design of CMOS Radio-Frequency Integrated Circuits*" by Thomas H. Lee, Cambridge University Press, 1998. Most of the traditional microwave transmission line applications are primarily involve with narrow band signals. Therefore, those skilled in the art confine the L and C such that $R \ll j\omega L$ and $G \ll j\omega C$. However, it is difficult to achieve such a condition with a broadband signal which has frequency components practically down to DC or zero frequency.

More particularly in the case of IC micro transmission lines, when the line frequency becomes low, such as below 2 or 3 GHz, for example, R becomes comparable to $j\omega L$ or even much larger comparable to $j\omega L$. The characteristic impedance in this case becomes a complex number, is not constant, and is frequency dependent. This complex nature and frequency dependency nature of the characteristic impedance causes a propagation group velocity delay (GVD) of the signal traveling along the transmission line and, thus, the line is unacceptably dispersive. This turns out to be a characteristic of the transmission line and has nothing to do with transmission line reflection although reflection will also occur since the transmission line is not impedance matched.

What is needed is to extend the range of frequencies over which a micro transmission line has constant characteristic impedance, particularly at lower frequencies, such is into the megahertz and kilohertz range or lower.

OBJECTS OF THE INVENTION

Therefore, it is an object of the present invention to overcome the aforementioned problems.

SUMMARY OF THE INVENTION

According to this invention, a micro transmission line is provided with distributed shunt resistance, $R_{SH}$, along the micro transmission line permitting the extension of constant characteristic impedance to lower signal frequencies relative to a signal propagating along the line. Any signal attenuation brought about by the added shunt resistance to the transmission line circuit may be compensated by providing gain to the signal at the transmission line input or outputs. One or more amplifiers may be provided to restore the gain of the attenuated signal. As a result, signal components or linewidth components at lower frequencies are not dispersive along the transmission due to group velocity dispersion (GVD) but rather are also frequency independent as are the higher frequency linewidth components.

A particular application for such a micro transmission line is in an IC chip where a multi-millimeter transmission line is utilized in an equalizer circuit deployed in a telecommunication network, such as, for example, in optical telecommunication systems employing a feed forward equalizer (FFE) in the optical receiver. However, the employment of this invention may be applied to other applications where there is a requirement to achieve a constant characteristic impedance in a transmission line at such lower signal frequencies or lower signal linewidth frequency components and adjustments can be readily made by adding either lump shunt resistance or distributed shunt resistance to a micro transmission lines or other such transmission lines acceptable or are capable of receiving series and shunt resistance design changes.

Other objects and attainments together with a fuller understanding of the invention will become apparent and appreciated by referring to the following description and claims taken in conjunction with the accompanying drawings. The drawings are not necessarily to scale so that emphasis instead is placed on the principals and features of the invention.

BRIEF DESCRIPTION OF THE DRAWINGS

In the drawings wherein like reference symbols refer to like parts.

DETAILED DESCRIPTION OF THE INVENTION

Figure 1:
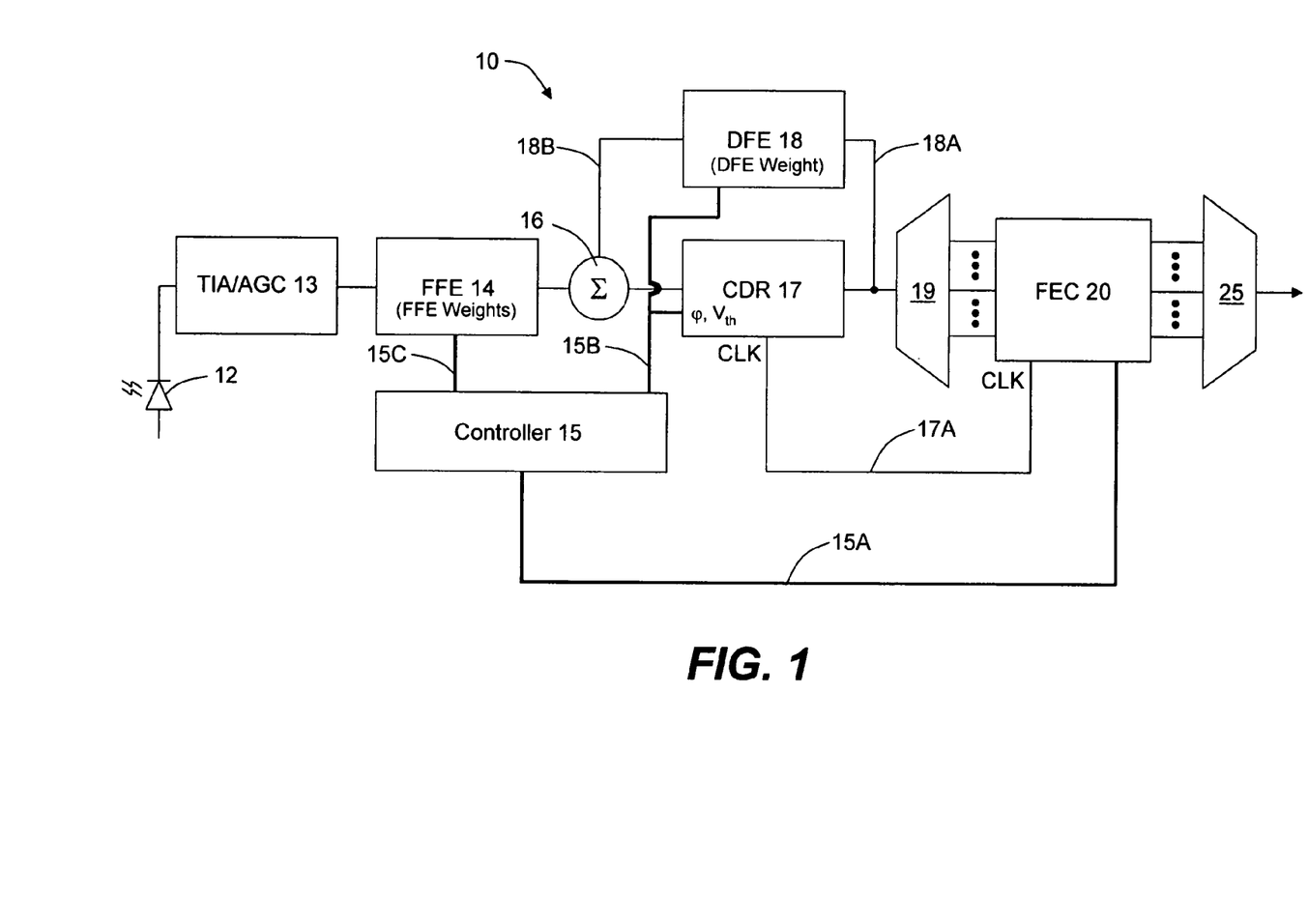
FIG. 1 is a diagrammatic view of an optical receiver that may be utilized in connection with this invention.

Reference is now made to FIG. 1 which illustrates a block diagram of an optical receiver 10 that may be utilized in connection with this invention. It will be appreciated by those skilled in the art that the application of a micro transmission line according to this invention may be employed in other applications, other then an optical receiver, for example, any application utilizing an analog feed forward equalizer (FFE), in any signal detection and/or recovery application, or any analog signal processing application requiring the use of a signal delay line as well as in transmission lines formed on PCBs, ICs or other analog transmission line circuits were the values of equation (1) may be adjusted in a practical manner in designing such transmission line circuits.

Optical receiver 10 has a signal path that includes photodetector 12 where the optical signal is converted into a current signal, the amplitude of which is representative of the optical pulses of the incoming optical channel signal such as in the case of amplitude modulated channel signals. This current signal is then converted into a voltage signal at transimpedance amplifier 13. TIA/AGC 13 also includes an automatic gain control (AGC) circuit to amplify the signal. The signal is then provided to analog transversal filter (TF) or linear feed forward equalizer (FFE) 14, as known in the art, and is illustrated in more detail in FIG. 2. FFE 14 provides for correction of transmission impairments to the channel signal, particularly group velocity dispersion (GVD) of the transmitted signal. At the input of FFE 14, the electrical signal is delayed, divided into several paths, recombined and amplified and, then, sent onto clock and data recovery (CDR) circuit 17. Circuit 17 provides for clock and data recovery (CDR) from the data signal and includes a decision circuit for determining whether a bit is a binary "1" or a binary "0". The output from FFE 14 is connected, via summer circuit 16, to CDR circuit 17. Circuit 17 also includes an eye-monitor circuit to estimate the vertical eye margin and a phase locked loop (PLL) for timing or phase margins. The recovered signal clock is also provided to the forward error correction (FEC) circuit 20 via line 17A. At the output of CDR circuit 17, there is a feedback line 18A to a one-bit nonlinear decision feedback equalizer (DFE) 18 which provides for additional signal distortion correction. It should be noted that DFE 18 can also be multiple bits long and not just one bit as shown here. However, as known in the art, the adding of additional bit equalizers to the DFE requires more power so that there is a tradeoff as to the number of bit equalizers that should be included in a DFE. DFE 18 makes adjustment of the bit decision threshold in circuit 17 for the next signal bit based upon differences relative to a previous signal bit decision. Such equalizers are particularly included in optical receivers that process data rates at or beyond transmission rate of 10 Gbps. The weighted feedback from DFE 18 is provided on line 18B to summer 16 where it is combined with the incoming signal from FFE 14 to provide further signal equalization prior to data recovery at circuit 17.

Controller 15 is an adaptive control that includes a CPU or computer system as well as an error monitor for both FFE 14 and DFE 18 and is coupled to them respectively via lines 15A and 15B as well as coupled to CDR circuit 17. Controller 15 also receives error counts from FEC 20 via line 15C. A function of controller 15 is to provide for weight coefficients to both FFE 14 and DFE 18 based on error counts received from FEC 20.1 Pattern-dependent error counts generated and accumulated at FEC 20 in the optimization of the received data signal may be employed for determining operational parameters used in equalization such as determining eye pattern optimum threshold ($V_{th}$) and phase ($\phi$) as well as employed for determining the filter weights or coefficient values to be employed with equalizers 14 and 18.

The distortion compensated signal emerging from CDR circuit 17 may be provided to deserializer 19 to separate the recovered serial data signal into plural lower bit rate data signal portions which portions are then FEC decoded at FEC 20 with appropriate corrections being made to errored 1's or errored 0's in the signal. Next, the corrected signal portions are combined at serializer 25 to provide a substantially better distortion-free electrical signal that is a fair replica of the optical signal originally received at photodetector 12. The signal need not, in some FEC decoder embodiments, be deserialized in this manner, but such deserialization enhances the rate of correction determination to be made to the incoming data signal. The FEC error correcting codes that may be employed, for example, are R-S codes, BCH codes, Hamming codes, Viterbi codes, turbo codes or concatenated codes.

Figure 2:
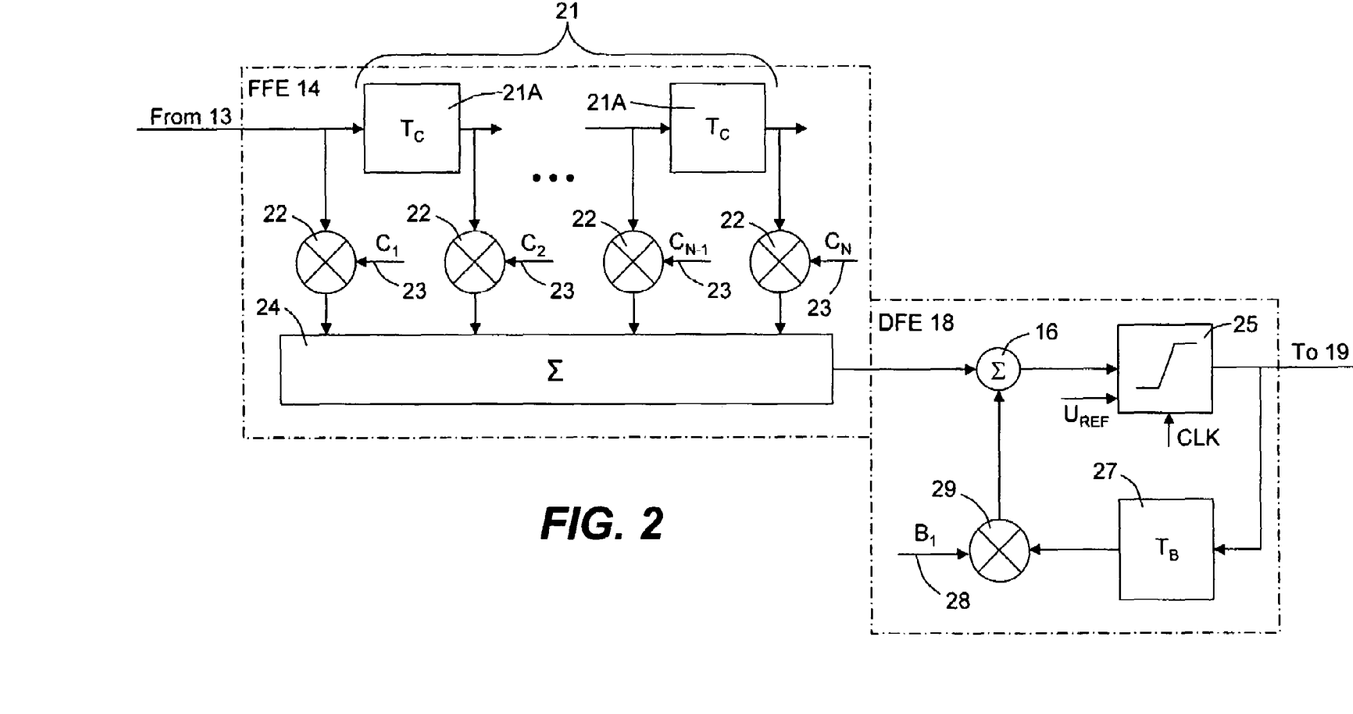
FIG. 2 is a detailed diagrammatic view of the equalizer circuits of the optical receiver shown in FIG. 1.

Reference is now made to FIG. 2 which illustrates in further detail the FFE 14 and DFE 18 of FIG. 1. These equalizers are shown in concatenated arrangement. These circuits can be realized as IC chips employing SiGe technology or CMOS technology, for example. The data signal is received by FFE 14 via micro transmission line 21 and is divided into several tapped paths with intervening time delay segments 21A and each piece of data performs a multiplication at multiplication stages 22 with corresponding weight setting values, $C_0$, $C_1$, ..., $C_{N-1}$, and $C_N$, which produces a series of filtered values. Transmission line 21 may be formed in an IC chip as a metalized stripline or a micro stripline comprising several tens of millimeters, for example. The resulting weighted values from stages 22 are summed at 24 which provide N delays, such as by 50 ps, and the superimposed weighted signals are provided at its output to summer circuit 16. The tap weights, $C_o, C_1, \ldots, C_{N-1}$, and $C_N$, are adjusted by external tuning voltages which are applied at the multiplication stages 22 thereby enabling analog filter 14 to adapt to a transfer function providing corrections to actual signal distortions of an incoming channel signal or signals.

DFE is a digital filter and takes the last bit from the current signal which has been acted upon relative to a bit decision made in CDR decision circuit 25 and is delayed at 27, for example, by $T_B$=100 ps, and the weight value $B_1$, presented at 28, is multiplied with the bit value at single stage 29 and added to the current bit value at summer circuit 16. The basic approach of DFE 18 is to subtract out interferences coming from previous decided data bits so that the decision on the current bit is made based on current signal bit minus interference on a succeeding or forward looking signal bit. This DFE function is highly useful toward further mitigation of signal chromatic dispersion or GVD at higher bit rates.

Figure 3:
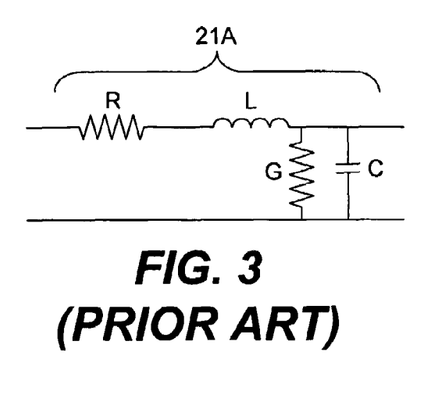
FIG. 3 is a circuit equivalent for a micro transmission line segment as known in the art.

In an IC chip, the micro transmission line segments 21A may be represented by the characteristic impedance, $Z_0$, of equation (1) and has an equivalent circuit as shown in FIG. 3. In FIG. 3, R is the inherent or designed series resistance of transmission line segment 21A, L is the inherent or designed line inductance of segment 21A, G is the inherent or designed shunt resistance of segment 21A and C is the inherent or designed capacitance of segment 21A. As indicated previously, if R and G are nearly zero in value, then the transmission line impedance is generally frequency independent per equation (2). Such transmission lines are typically designed to have an impedance, Z, equal to 50 ohms and work well for signal frequencies where the values of R and G are negligible. As a result, typically one only cares about the values for L and C because the values of $\omega L$ and $\omega C$ are so big compared to the values for R, series resistance of the transmission line, and G, the shunt resistance of the transmission line, as can be readily seen upon examination of equation (1). In the deployment of micro metal striplines as transmission lines, such as in IC chips, at low frequencies the value of G is still relatively small because these IC circuits have relative good electrical insulation in the circuit and, therefore, provide good dielectric isolation of the transmission line. In this connection, it should be noted that the value of G is basically leakage through the dielectric. At very high frequencies, however, such as in the range of tens of GHz, the values of R and G become a concern since there are some skin effect and dielectric losses. At these high frequencies, good high frequency dielectric material is provided that achieves low dielectric loss. On the other hand, at low frequencies, such as in the range of tens of KHz and MHz or, said another way, values below about 2 GHz particularly for an IC micro transmission line, the value of R in the impedance equation (1) becomes more important since the value of $\omega L$ becomes comparable or smaller than the value of R at lower frequencies. The value of G is typically negligible since the dielectric loss at low frequencies is typically very low. Thus, in the case of a metal transmission line formed in an IC chip, the value of R becomes more important compared with $j\omega L$ or $j\omega C$, since $\omega$ becomes relatively small, but the energy below about 2 GHz is still a significant amount. At higher frequencies, the line impedance, $Z_0$, is $\sqrt{L/C}$ and the line impedance termination is typically designed at 50 ohms with relatively signal propagation having frequencies independent of different group velocity delays, i.e., the signal frequency components propagate in the transmission line generally all at the same rate without phase shift. The correct ratio between L and C is achieved so that the signal energy propagates between the reactive components of the line, L and C so that the phase is maintained and there is no signal reflection at the end of the transmission line. However, below about 2 GHz, the value for R is significant and makes the transmission line impedance, $Z_0$, a complex number, where $$Z_0 \cong \sqrt{\frac{R+j\omega L}{j\omega C}}$$

so that signal reflection in the transmission line becomes high. Also, because the propagation constant, $\gamma=\sqrt{j\omega C(R+j\omega L)}$, becomes a complex number too so that there results an additional frequency dependent phase shift. This phase shift will cause a large amount of signal distortion, in particular, signal dispersion or group velocity delay (GVD), i.e., the frequency components of the signal are traveling at different velocities distorting the shape of the signal. Some have suggested a solution to this problem through the employment of a digital equalizer circuit to correct the signal distortion, but it is very difficult to build an adaptive electronic circuit capable of correcting such a distorted waveform.

I have discovered that at low frequencies, such as, in particular, in the range, for example, from about one or several megahertz to about a couple of gigahertz, or even at lower frequencies than this range, the shunt resistance value, G (hereinafter also referred to as $R_{SH}$), provides a significant role at these low frequencies so that if shunt resistance, $R_{SH}$, is added to the transmission line or is distributed along the finite length of the transmission line to match the series resistance, $R_{SR}$, an impedance match can be achieved so that there is little or no signal dispersion occurring in the line and there are no signal reflections in the transmission line at these lower frequencies. Thus, for 50 ohm transmission line, the value for C is equal to $$\frac{L}{2500}$$

if the value for G is equal to $$\frac{R}{2500},$$

then the line impedance, $Z_0$, will be:

$$Z_0 = \sqrt{\frac{R+j\omega L}{\frac{R}{2500} + j\omega \frac{L}{2500}}} = 50\ \Omega. \quad (5)$$

Here, $$a = \frac{R}{50}$$

and therefore is not equal to zero.

$$\beta = \omega \frac{L}{50} = \omega \sqrt{LC}$$

and $$V_g = \frac{d\omega}{d\beta} = \frac{1}{\sqrt{LC}}.$$

The group velocity, $V_g$, is constant over frequency and, therefore, there is no dispersion. Also, $\alpha\beta$ is constant over frequency and, therefore, there is no frequency dependent and only decay over distance. Therefore, if shunt resistance, $R_{SH}$, is either added as a lump sum to the transmission line or is substantially distributed along the length of the transmission line, the value for $Z_0$ is no longer a complex number and there results no group velocity delay (GVD) and the transmission line will no longer be dispersive. The values of R and G are nonreactive components of the transmission line and they do not affect the phase of the signal propagating through the transmission line. All of the frequency components will propagate at the same velocity and there is no signal reflection at the end of the transmission line so that the group velocity delay is flattened. Thus, by adding loss to the transmission line, the signal reflection at low frequencies can be substantially eliminated by introducing additional shunt impedance into the micro strip transmission line and the impedance mismatch can be brought into a matched condition by matching the line shunt impedance with the line series impedance. In the case of a tapped transmission line where the signal is being taken off the transmission line at tapped intervals along its finite length, the loss incurred by the tapped signal can be compensated for by in-line IC amplifiers. Thus, to render the transmission line nondispersive, additional shunt impedance, $R_{SH}$, is added to the transmission line and to compensate for transmission line loss due to added impedance, an amplifier is added to boost the gain of the signal either at the end of the transmission line or at tapped points along the transmission line when employed, for example, as a circuit delay line.

It should be noted that in the case of distributed shunt resistance, $R_{SH}$, along the transmission line added at tapped points of the line, the amount of resistance and, consequently the amount of loss, at each tapped point may be different so that calculations may be made to provide for the correct values of resistance along the transmission line. This is much easier to deal with than attempting to deal directly with the group velocity delay (GVD) along the transmission line, particularly since the group delay may be different along the tapped segments of the transmission line. As previously indicated, it is difficult to deal with signal GVD employing an electronic compensating circuit.

With a finite transmission line, the finer transmission line segment steps of added shunt impedance to the line, the more flatten is the response of the transmission line. Also, the finer the step size or segments for values of added shunt resistance, $R_{SH}$, along the line, the smaller the conductance value that is need to be added to each segment with larger amount of impedance elements added to the circuit. Thus, in theory, the more distributed the shunt resistance along the transmission line, the flatter the signal response that will be achieved along the transmission line. However, there is a point of practicality of how small the steps should become which will outweigh the benefits received in achieving, in a practical manner, a more flatten signal response. Thus, by adding a limited number of discrete shunt resistance components, an artificial transmission line can be synthesized to achieve the desired flat signal delay response without changes in signal phase or causing signal reflection in the transmission line.

In the case of a metal micro stripline in an IC chip functioning as a transmission line, the metalized transmission line may be, for example, several tens of millimeters long and formed in a serpentine manner to provide for compactness in the IC chip. The IC transmission line is typically designed to be 50 ohms and the distributed shunt resistance, $R_{SH}$, may, in sum, be a couple of 100 ohms, for example, depending, of course, upon the series resistance, $R_{SR}$, the line length and its impedance. In this manner, frequencies present in the signal in the millihertz, kilohertz, megahertz and low gigahertz range will be compensated for by providing for a flatten response across the full range of frequencies in the signal frequency envelope or linewidth. The adding of a couple 100 ohms resistance to a 50 ohm transmission line appears, upon first blush, to be incorrect and counterintuitive, particularly since the transmission line is being rendered lossier by the addition of impedance to the line. However, by equalizing the series and shunt impedance through the addition of shunt resistance, $R_{SH}$, to the transmission line, the response of the line can be substantially flattened, without incurring any significant phase change or signal reflection.

Figure 4:
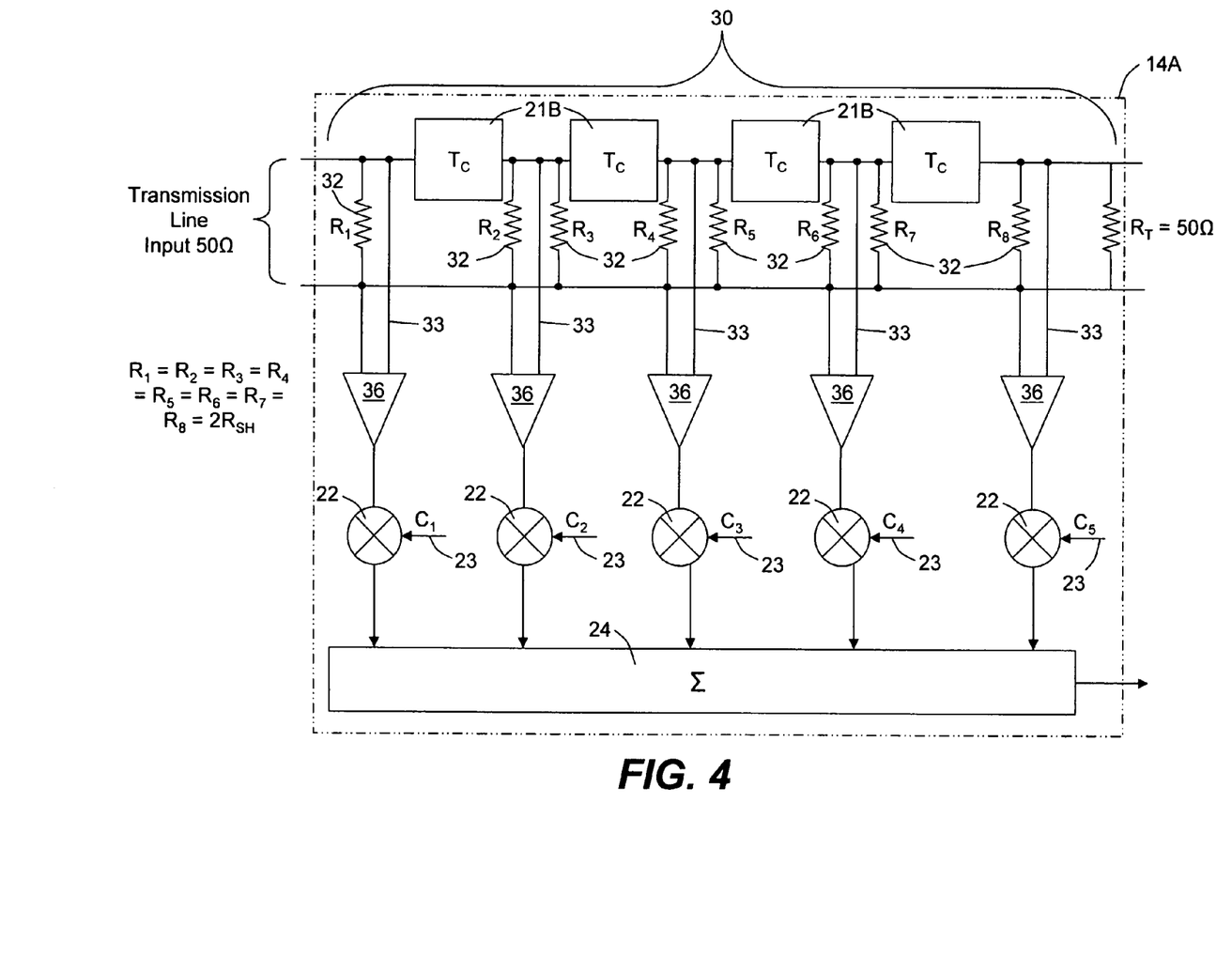
FIG. 4 is a circuit equivalent of a micro transmission line of this invention.

The application of this invention to FFE 14 of FIG. 2 is illustrated in an equivalent circuit configuration in FIG. 4 as FFE 14A comprising micro transmission line 30 having tapped delay segments 21B between which shunt resistances 32, $R_1$ to $R_8$, are added between these segments to provide for distributed shunt impedance along transmission line 30. At each tapped point 33, an amplifier 36 is provided to boost the gain of the tapped signal output due to loss brought about by the added shunt resistance 32. The segments 21B are of the same size and, therefore, may have the same delay but the weighting of each tapped signal point may be adjusted by the tap weights 23 to synthesize or simulate the desired transfer function. Therefore, equalizer 14A functions like an adaptive linear filter. As the dispersion on the incoming signal or signals changes, the weightings at 23 may be changed to synthesize a different transfer function to meet the changes in signal dispersion. The several weighted values are then summed up at summation circuit 24.

Figure 5:
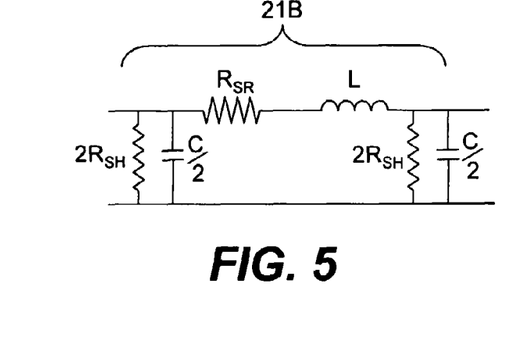
FIG. 5 is a circuit equivalent for a micro transmission line segment as utilized in this invention.

The termination of the transmission line 30 is provided with a resistance, $R_T$, comprising line termination resistor 34 of 50 Ω. As noted in FIG. 4, $R_2$, $R_3$, $R_4$, $R_5$, $R_6$ and $R_7$ are each the same values of distributed shunt resistance, $2R_{SH}$. This is shown in more detail in reference to FIG. 5 which shows the equivalent circuit of an intermediate segment 21B relative to this invention where the added shunt resistance, $R_{SH}$, is distributed at the beginning and at the end of each such segment so that the total shunt resistance between adjacent segments is basically equal to $2R_{SH}$. However, in order to realize uniform distribution of shunt resistance along the transmission line, the beginning and ending segments will, therefore, have to be $2R_{SH}=R_1=R_8$. In FIG. 5, the inherent or designed values for the series resistance, $R_{SR}$, and L are shown as well as the values for the inherent or design value for C is shown in a distributed manner along segment 21B as C/2 at the beginning and end points of segment 21B. It is noted that in regard to FIGS. 4 and 5, the shunt resistance, $2R_{SH}$, could also be shown just as easily as one single resistance or just $R_{SH}$.

In summary, the feed forward equalizer (FFE) circuit in equalizer 14A has an important function of synthesizing the transfer function of the channel signal or signals through the use of a transmission delay line by calculating the amount of desired line delay desired, $V_g=1/\sqrt{LC}$, i.e., by increasing the value of LC for larger delay, and changing of the weighting at each of the tapped points 33 of transmission line 30 to achieve the desired transfer function. By changing the weighting of each tapped line point 33, the transfer function can be simulated. The weightings are adjusted by weighted amplifiers and the different weighted values are summed up in a summation circuit 24. Also, the FFE functions as a high frequency pass filter to undo high frequency roll off caused by electronic circuits prior to equalizer 14A, such as TIA and/or AGC circuit chip or chips 13 as well as caused by PCB metal traces for carrying the signal or signals between the foregoing circuit chips and the equalizer IC chip.

Figure 6:
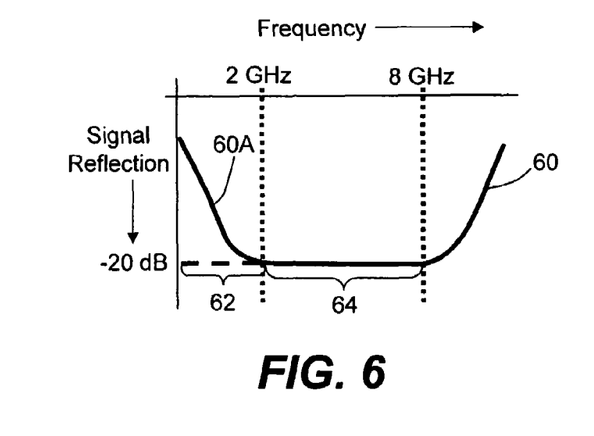
FIG. 6 is a graphic illustration of the extension of constant characteristic impedance to lower signal frequencies with the employment of this invention illustrating that substantially no signal reflection occurs at these lower signal frequencies.

Reference is now made to FIG. 6 which illustrates signal reflection versus frequency for transmission lines 21 and 30. Increasing signal reflection is a direct indication of increasing impedance, $Z_0$, where this impedance becomes a complex number. In the case of segments 21A where transmission line 21 has no added shunt resistance, the signal reflection response is seen at curve 60. To be noted is that at the lower frequency portion 60A of curve 60, approximately around 2 GHz, the signal reflection sharply increases which, in turn, means that the value for $R_{SR}$ becomes increasingly larger compared to $j\omega L$ or $j\omega C$ as the frequency, $\omega$, goes to zero. It can be seen at the region 64, the frequencies are basically independent of the resistance values as they remain relatively small in value. However, as seen in FIG. 6, the added shunt resistance, $R_{SH}$, as taught in this invention, provides for a flatten frequency response for frequencies below 2 GHz to zero, as indicated by the dotted line at 62, to compensate for lower frequencies so that the impedance is fairly constant over a much large frequency range from zero to about 8 GHz.

At higher frequencies, shown here beyond about 8 GHz, the signal reflection increases as the values of $R_{SR}$ and $R_{SH}$ increase with frequency due to the so called skin effect because the signal is no longer flowing completely within the transmission line conductor but rather a large portion is flowing outside or along the edge of the transmission line conductor. Thus, at these higher frequencies, the values for R and G in equation (1), in theory, are frequency dependent values. The higher frequency end can be compensated for if the skin effect resistance change over the higher frequencies for $R_{SH}$ can be made substantially the same as the skin effect resistance change over the same higher frequencies for $R_{SR}$. However, for the present applications in the frequency range of channel signals up to about 8 GHz, the value for the shunt resistance, $R_{SH}$, is substantially frequency independent.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A transmission line, comprising:
    a plurality of delay segments; and
    a plurality of output taps, each of which being coupled to a corresponding one of the plurality of delay segments,
    wherein each of the plurality of delay segments has a first shunt resistance, a second shunt resistance, and a series resistance, such that a sum of the first shunt resistance and the second shunt resistance matches the series resistance and a signal delay response associated with the transmission line is substantially flat.

2. The transmission line of claim 1 wherein an amplifier is provided at each of the plurality of output taps.

3. The transmission line of claim 1 wherein the transmission line is a metal microstrip integrated circuit delay line in a feed forward equalizer (FFE).

4. The transmission line of claim 1 wherein the second shunt resistance is distributed along a length of the transmission line.

5. The transmission line of claim 4 wherein the second shunt resistance is provided between adjacent ones of the plurality of delay segments.

6. The transmission line of claim 5 wherein the plurality of delay segments is a plurality of first delay segments, the transmission line further including a second delay segment provided at a first end of the transmission line and a third delay segment at a second end of the transmission line, the second delay segment having a third shunt resistance that is twice that of the first shunt resistance and the third delay segment having a fourth shunt resistance that is twice that of the first shunt resistance.

7. The transmission line of claim 1 wherein the transmission line has an output and a third shunt resistance provided at the output of the transmission line.

8. The transmission line of claim 7 wherein an amplifier is provided at the output of the transmission line.

9. A feed forward equalizer (FFE) comprising:
    a transmission line including a plurality of delay segments;
    a plurality of output taps, each of which being coupled to a corresponding one of the plurality of delay segments, such that each of the plurality of output taps is provided between adjacent ones of the plurality of delay segments;
    a plurality of amplifiers;
    a plurality of weighted stages each of which being coupled to a corresponding one of the plurality of amplifiers; and
    a summation circuit coupled to each of the plurality of amplifiers,
    wherein each of the plurality of delay segments has a series resistance and a shunt resistance, the shunt resistance matching the series resistance.

10. The feed forward equalizer (FFE) of claim 9 wherein each of the plurality of weighted stages comprises a multiplier circuit with a weighted value input.

11. A method of providing a transmission line, comprising:
    forming a plurality of delay segments; and
    forming a plurality of output taps, each of which being coupled to a corresponding one of the plurality of delay segments,
    wherein each of the plurality of delay segments has a first shunt resistance, a second shunt resistance, and a series resistance, such that a sum of the first shunt resistance and the second shunt resistance matches the series resistance and a signal delay response associated with the transmission line is substantially flat.

12. The method of claim 11 comprising the further step of providing the second shunt resistance at an input or output of each of the plurality delay segments.

13. The method of claim 12 comprising the further step of coupling each of a plurality of amplifiers to a corresponding one of the plurality of output taps.

14. The method of claim 11 comprising the further step of providing the transmission line in an IC chip.

15. The method of claim 14 wherein the transmission line is a micro metal stripline in the IC chip.

16. The method of claim 11 comprising the further step of coupling each of a plurality of amplifiers to a corresponding one of the plurality of output taps.

17. The method of claim 16 comprising the further steps of
coupling each of a plurality of weighted stages to a corresponding one of the plurality of amplifiers; and
coupling a summation circuit to each of the plurality of amplifiers.

18. The method of claim 17 comprising the further step of providing the transmission line in a serpentine path on an IC chip.

* * * * *